United States Patent [19]

Bratt et al.

[11] Patent Number: 5,537,538
[45] Date of Patent: Jul. 16, 1996

[54] DEBUG MODE FOR A SUPERSCALAR RISC PROCESSOR

[75] Inventors: Joseph P. Bratt, San Jose; John Brennan, Mountain View; Peter Y. Hsu, Fremont; Chandra S. Joshi, Saratoga; William A. Huffman, Los Gatos; Monica R. Nofal, Los Altos; Paul Rodman, Palo Alto; Joseph T. Scanlon, Sunnyvale; Man K. Tang, Milpitas, all of Calif.

[73] Assignee: Silicon Graphics, Inc., Mountain View, Calif.

[21] Appl. No.: 166,969

[22] Filed: Dec. 15, 1993

[51] Int. Cl.$^6$ .............................. G06F 11/34; G06F 9/30
[52] U.S. Cl. .............. 395/183.14; 395/375; 364/232.23; 364/280.8; 364/DIG. 1
[58] Field of Search ..................................... 395/575, 375, 395/800, 183.13, 183.14, 183.15; 364/280.8, 232.23, 931.55

[56] References Cited

U.S. PATENT DOCUMENTS

| | | | |
|---|---|---|---|
| H1,291 | 2/1994 | Hinton et al. ............................. | 395/800 |
| 5,109,514 | 4/1992 | Garner et al. ............................ | 364/200 |
| 5,150,469 | 9/1992 | Jouppi ..................................... | 395/375 |
| 5,155,816 | 10/1992 | Kohn ....................................... | 395/375 |
| 5,204,829 | 4/1993 | Lyu et al. ................................ | 364/748 |
| 5,241,636 | 8/1993 | Kohn ....................................... | 395/375 |
| 5,257,214 | 10/1993 | Mason et al. ........................ | 364/736.5 |
| 5,261,063 | 11/1993 | Kohn et al. .............................. | 395/375 |
| 5,305,248 | 4/1994 | Ammann ................................ | 364/748 |
| 5,367,703 | 11/1994 | Levitan ................................... | 395/800 |
| 5,386,375 | 1/1995 | Smith ...................................... | 364/748 |
| 5,388,242 | 2/1995 | Jewett ..................................... | 395/425 |
| 5,392,228 | 2/1995 | Burgess et al. ..................... | 364/715.04 |

OTHER PUBLICATIONS

Bob Ryan "Risc Drives Power Pc" Byte Aug. 1993 pp. 79–90.
Hanson et al. "The C400 Superscalar/superpipelined RISC Design" IEEE 1991, pp. 247–251.
Dick Pountain "Pentium: More RISC than CISC" 1 Sep. 1993 Byte pp. 195–204.
Tom Asprey "Performance Features of The PA7100 Microprocessor" IEEE 1993 pp. 22–35.
DeLano et al. "A High Speed Superscalar PA–RISC Processors" 1992 IEEE pp. 116–121.
Tom Thompson "Power Pc Performs For Less" Byte 1993 pp. 56–72.
White et al. "How Does Processor MHz Relate to End–User Performance" 1993 IEEE pp. 8–16.
Patrick Knebel et al. "HP's PA7100LC: A Low–cost superscalar PA–RISC Processor" IEEE 1993 pp. 441–447.
Intrater et al. "A Superscalar Microprocessor" pp. 267–270 IEEE.
Yetter et al. "A 100 MHz superscalar PA–RISC CPU/coprocessor chip" 1992 IEEE pp. 12–13.
Moore et al. "IBM Single Chip RISC Processor (RSC)" 1992 IEEE pp. 200–204.
Gerry Kane and Joe Heinrich, "Floating–Point Exceptions," *MIPS RISC Architecture*, Prentice–Hall, Inc., Englewood Cliffs, N.J., pp. 9–1–9–4, 1992.

*Primary Examiner*—Robert W. Beausoliel, Jr.
*Assistant Examiner*—Albert Décady
*Attorney, Agent, or Firm*—Sterne, Kessler, Goldstein & Fox

[57] ABSTRACT

A processor system that is switchable between a normal mode of operation without precise floating point exceptions and a debug mode of operation with precise floating point exceptions. The processor system includes a dispatch for dispatching integer and floating point instructions, an integer unit having a multi-stage integer pipeline for executing the integer instructions, and a floating point unit having a multi-stage floating point pipeline for executing the floating point instructions. The system begins operation in the normal mode, and upon receipt of an instruction to "switch to debug mode," the processor switches to the debug mode of operation with precise exceptions. In the debug mode, once a floating point instruction has been dispatched, all other instructions are prevented from being committed until the system determines whether the floating point instruction generates an exception. Thus, permitting the system to signal precise exceptions when not in the normal mode.

4 Claims, 4 Drawing Sheets

5,537,538

DEBUG MODE FOR A SUPERSCALAR RISC PROCESSOR

CROSS-REFERENCE TO OTHER APPLICATIONS

The following applications of common assignee contain some common disclosure, and are believed to have effective filing dates identical with that of the present application:

U.S. patent application Ser. No. 08/168,832 entitled "Split-Level Cache".

U.S. patent application Ser. No. 08/168,094 entitled "Superscalar Microprocessor Instruction Pipeline Including Instruction Dispatching and Kill Control".

U.S. patent application Ser. No. 08/168,827 entitled "Conflict Resolution In Interleaved Memory System With Multiple Parallel Accesses".

U.S. patent application Ser. No. 08/168,744 entitled "Apparatus for Processing Instructions in a Computing System".

U.S. patent application Ser. No. 08/168,822 entitled "Variable Page Size Translation Lookaside Buffer".

U.S. patent application Ser. No. 08/167,006 now U.S. Pat. No. 5,493,523 entitled "Mechanism and Method for Integer Divide Involving Pre-Alignment of the Divisor Relative to the Dividend".

U.S. patent application Ser. No. 08/167,005 entitled "System and Method for Coherency in a Split-Level Data Cache System".

U.S. patent application Ser. No. 08/167,004 entitled "Load Latency of Zero and Cache Coherency of Store Operations Resulting from Out-of-Order Floating Point Execution in a RISC Processor".

BACKGROUND OF THE INVENTION

1. Field of the Invention

The present invention relates generally to the field of computers, and more particularly, to a system and method for implementing a debug mode in a superscalar reduced instruction set computer (RISC) which does not support precise floating point exceptions in its normal mode of operation.

2. Related Art

Superscalar reduced instruction set computers (RISC) (commonly referred to as "RISC processors") are rapidly becoming the new computer architecture for machines for single processor workstations to multiprocessor supercomputers. The MIPS RISC architecture is a specific architecture exemplified by the R2000, R3000, R4000 and R6000 (collectively known as the R series) processors. A book titled, *MIPS RISC Architecture* by G. Kane and J. Heinrich (Prentice Hall, Englewood Cliffs, N.J., U.S.A., 1992), is the primary reference manual for the MIPS RISC architecture and is incorporated herein by reference.

The following three text books provide further discussions of RISC architecture: John L. Hennessy and David A. Patterson, *Computer Architecture—A Quantitative Approach*, (Morgan Kaufmann Publishers, Inc., San Mateo, Calif., U.S.A., 1990); Mike Johnson, *Superscalar Microprocessor Design*, (Prentice Hall, Englewood Cliffs, N.J., U.S.A., 1991); and Stephen B. Furber, *VLSI RISC Architecture and Organization*, (Marcel Dekker, Inc., New York, N.Y., U.S.A., 1989), all of which are incorporated herein by reference.

All previous MIPS machines have had precise exceptions. Precise exceptions require two necessary conditions: (1) the address of the instruction that caused the exception (the excepting instruction) must be available to the processor or the user, and (2) the processor must be able to return its state back to the state that it was in just prior to the execution of the instruction that caused the exception. That is, if anything goes wrong with an instruction, all previous MIPS processors, for example, recover the state of the processor just before executing that instruction and then transfer program flow to a software handler that can determine what to do with that instruction and the subsequent instruction stream.

The problem with having precise exceptions is that it takes a great deal of hardware in the processor to get back the state just before the excepting instruction is executed. Specifically, more hardware is required to handle precise exceptions as the processors are designed to have more parallelism (performing more operations at the same time).

Some types of exceptions do not need to be precise. If a floating point divide by zero error occurs, for instance, most programs either terminate or run without exception. In neither case is it essential to the correct operation of the program that floating point divide by zero exceptions be precise. On the other hand, very few programs will run correctly with imprecise translation lookaside buffer (TLB) refill exceptions. Thus, a distinction can be made between integer exceptions, which have to be precise, and floating point exceptions, which may not.

What is desired is a processor that provides the parallelism made possible by imprecise floating point exceptions, but still provides precise exceptions to those few older programs that cannot run without them.

SUMMARY OF THE INVENTION

The present invention is directed to a system and method that achieves more parallelism, and thus a performance advantage, by omitting precise floating point exceptions, while providing a debug mode for running programs that require precise floating point exceptions.

The processor system is switchable between a normal mode of operation without precise floating point exceptions and the debug mode. The programmer of software to run on the system can program switches into and out of debug mode or the system operating system can perform the switches.

Once the system switches to the debug mode and a floating point instruction is executed, further instructions are stalled until the system determines whether that instruction generates an exception, thus permitting the system to signal precise exceptions when in the debug mode. In this manner, the system need now back out processor state if an exception is generated by the instruction. The floating point pipeline design permits new instructions to be dispatched a few cycles before the system determines whether the floating point instruction generated an exception. This way the system can process those new instructions at full superscalar bandwidth if no exception is generated by the floating point instruction.

The debug mode according to the present invention permits debugging of new programs during their development, even though such new programs will be designed to run without precise floating point exceptions.

The foregoing and other features and advantages of the present invention will be apparent from the following more particular description of the preferred embodiments of the invention, as illustrated in the accompanying figures.

BRIEF DESCRIPTION OF THE FIGURES

The invention will be better understood if reference is made to the accompanying drawings in which.

DETAILED DESCRIPTION OF THE PREFERRED EMBODIMENT

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

The preferred embodiment of the invention is now described with reference to the figures where like reference numbers indicate identical or functionally similar elements. Also in the figures, the left most digit of each reference number corresponds to the figure in which the reference number is first used.

System Overview

Figure 1:
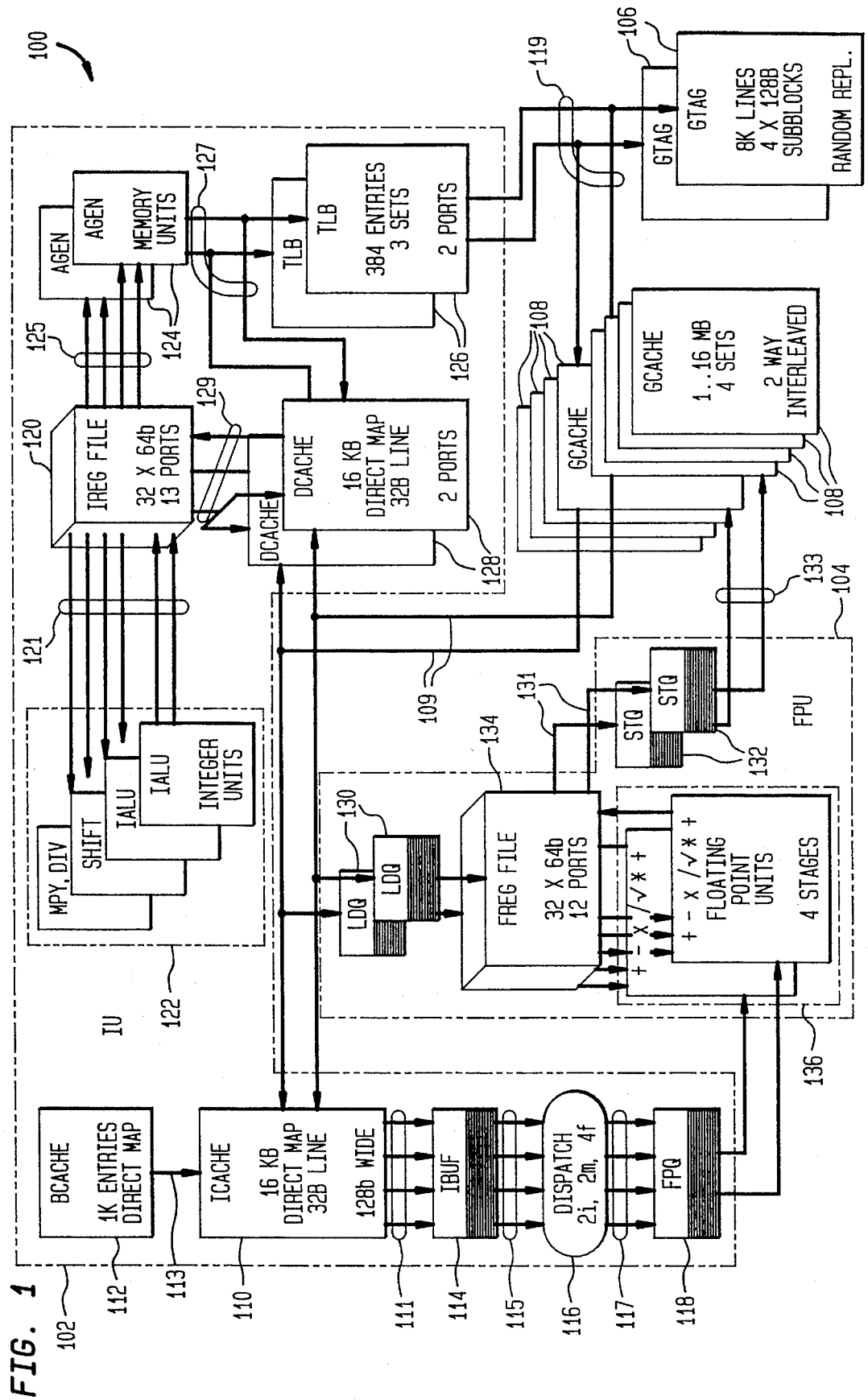
FIG. 1 shows a high level representative block diagram of a processor system 100 according to the present invention.

An understanding of the processor system of the invention and how is it operates in general is necessary to understand debug mode of operation. FIG. 1 shows a high level representative block diagram of a processor system 100. The following description of processor system 100 is provided by way of example. The debug system and method of the present invention can be used in a processor system having various architecture schemes, as would be apparent to a person skilled in the relevant art. The processor system 100 can be integrated on a single chip or on two or more chips, as would also be apparent to a person skilled in the relevant art. In addition, the processor system 100 can be part of a multiprocessor computer system. Representative parameters and values of the preferred embodiment for the functional elements and blocks of FIG. 1 are indicated in the following discussion and in FIG. 1. While these are preferred in the disclosed implementation of the processor system 100, the present invention is not limited to these parameter and values, and instead extends to any parameters and values that produce the intended functionality and equivalents thereof.

The processor system 100 comprises two main chips, an integer unit chip (IU) 102 and a floating point chip unit (FPU) 104. Additionally, the system comprises two global tag random access memory (RAM) chips (GTAG) 106 and two banks of static RAM chips making up an external global cache (GCACHE) 108.

Instructions are fetched from an on-chip 16 KB (kilobyte) instruction cache (ICACHE) 110. This ICACHE 110 is direct mapped with 32B (Byte) lines. Four instructions (128 total bits) are fetched per cycle, as shown generally at buses 111. The ICACHE 110 is virtually indexed and virtually tagged. Software is responsible for maintaining coherence. The ICACHE 110 is refilled from the GCACHE 108 in 11 cycles via a pair of buses 109. The contents of the ICACHE 110 need not be a subset of the GCACHE 108. There is a branch prediction cache (BCACHE) 112 associated with the ICACHE 110 that sends control signals and branch instructions to ICACHE 110 via a bus 113. The BCACHE 112 is also direct mapped and contains 1K entries.

Instructions from the ICACHE 110 are buffered in an instruction buffer (IBUF) 114 and realigned before going to dispatch logic (means) 116 via buses 115. Up to four instructions chosen from two integer, two memory, and four floating point instruction types may be dispatched per cycle. Floating point instructions are dispatched via buses 117 into a floating point queue (FPQ) 118 where they can wait for resource contention and data dependencies to clear without holding up dispatching of integer instructions. In particular, the FPQ 118 decouples the FPU 102 from the IU 102 to hide the latency of the GCACHE 108, as will be described in further detail below.

Integer and memory instructions get their operands from a 13 port integer register (IREG) file 120. A plurality of integer function units 122 comprise two integer ALUs, one shifter, and one multiply-divide unit, and are coupled to the IREG file 120 via buses 121. The ALUs and shifter operate in one cycle. The multiply-divide unit is iterative: 4/6 cycles for 32b/64b (bit) integer multiply, 21 to 73 cycles for integer division depending on the value of the result. All iterative operations are fully interlocked for easy programming. Up to two integer operations may be initiated every cycle.

Memory instructions go through an address generation unit (AGEN) 124 via buses 125 and then to a translation lookaside buffer (TLB) 126 via buses 127. The TLB 126 is a three way set associative cache containing 384 entries. The TLB 126 is dual-ported so that two independent memory instructions can be supported per cycle. TLB misses are serviced by a software handler (not shown).

Integer loads and stores go to an on-chip data cache (DCACHE) 128 via buses 129. It, too, is dual-ported to support two loads or one load and one store per cycle. The DCACHE 128 is 16 KB direct-mapped with 32B lines and is refilled from the external cache in 7 cycles. It is virtually addressed and physically tagged. The DCACHE 128 is a proper subset of the GCACHE 108 and hardware (not shown) maintains coherence. The DCACHE 128 and GCACHE 108 comprise a split-level cache, where the DCACHE 128 serves as the first level cache and the GCACHE 108 serves as the second level cache.

The GCACHE 108 is two-way interleaved to support two 64b loads or stores per cycle. The GCACHE 108 is configurable from one to 16 MB in size. The GCACHE 108 is four-way set associative, each cache line containing four sectors or sub-blocks each with its own state bits. The line size is configurable as 128B, 256B, or 512B which corresponds to sector sizes of 32B, 64B or 128B, respectively. The external cache is implemented using a pair of custom tag RAMs (GTAG 106) and from 8 to 36 commodity synchronous static RAMs (GCACHE 108). Specific timing for the components, such as cache refill time, depends on the system implementation (i.e., it is application specific). The GCACHE 108 and GTAG 106 are addressed by the TLB 126 via buses 119. A further description of the split-level cache is found in the above cross-referenced patent application Ser. No. 08/168,832, titled "Split-Level Cache," which is incorporated herein by reference.

Floating point loads are done via a load data queue (LDQ) 130 coupled to buses 109. Floating point stores go off FPU chip 104 via buses 131 to a store data queue (STQ) 132 then to GCACHE 108 via buses 133, after translation to physical addresses by TLB 126 and bypass the on-chip DCACHE 128.

The FPU 104 is coupled to two execution data paths (buses 109) each capable of double precision fused multiply-adds, simple multiplies, adds, divides, square-roots, and conversions. A twelve port floating point register (FREG) file 134 feeds the execution data paths, which are themselves fully bypassed, via buses 135. A plurality of floating point functional units are shown generally at 136.

The floating point functional units comprise many various types. Short operations comprising compares, moves, and the like take one cycle. Medium operations comprising adds, multiplies, fused multiply-adds, and the like take four cycles and are fully pipelined. Long operations comprising divides, square-roots and the like are iterative. Divides take 14 and 20 cycles for single and double precision, respectively. The two datapaths are completely symmetric and indistinguishable to software. The compiler simply knows that it can schedule two floating point operations per cycle.

Integer/Floating Point Pipeline

Figure 2:
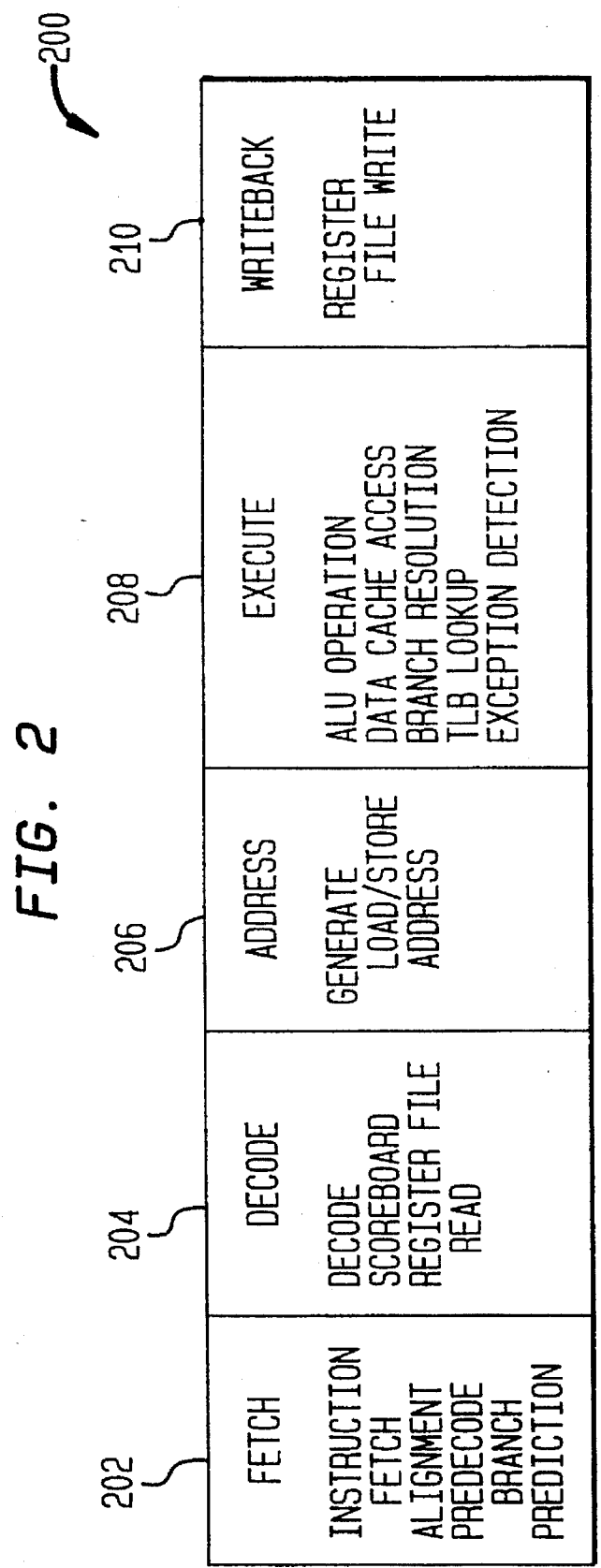
FIG. 2 shows an integer pipeline 200 for the integer unit 102 of FIG. 1 according to the present invention.

An integer pipeline 200 for the IU 102 is shown in FIG. 2. A Fetch (F) stage 202 accesses the ICACHE 110 and the BCACHE 112. A Decode (D) stage 204 makes dispatch decisions based on register scoreboarding and resource reservations, and also reads the IREG register file 120. An Address (A) stage 206 computes the effective addresses of loads and stores. An Execute (E) stage 208 evaluates the ALUs 122, accesses the DCACHE 128 and TLB 126, resolves branches and handles all exceptions. Finally, a Writeback (W) stage 210 updates the IREG register file 122.

This pipeline 200 differs from a traditional RISC pipeline in two ways: there are actually four pipelines—two integer ALU pipelines and two load/store pipelines, and ALU operations occur in parallel with data cache accesses. The traditional RISC pipeline has a load shadow; the instruction cycle immediately after a load cannot use the result of the load. This was found acceptable for scalar pipelines because the compiler can frequently put some independent instruction after a load. However, the compiler would have to find four independent instructions to cover the same shadow in this superscalar pipeline, a rather unlikely scenario.

By delaying the ALU the load shadow is removed for load to ALU operations, but creates an ALU shadow for load addresses. There is an extra cycle of delay when an address calculated by an ALU instruction is used as the base address by the following load or store instruction. The inventors found this trade-off to be advantageous because load-use dependencies occur more frequently than compute-load/store dependencies, particularly in branchy integer code which are not amenable to superscalar speedup. In addition, a new register+register addressing mode for floating point loads and stores helps reduce the need for precalculated addresses. A disadvantage of putting the ALU further down the pipeline is that it slows down branch resolution. This was mitigated by having branch prediction, and also by allowing the delay slot of branches to execute in parallel with the branch itself.

Figure 3:
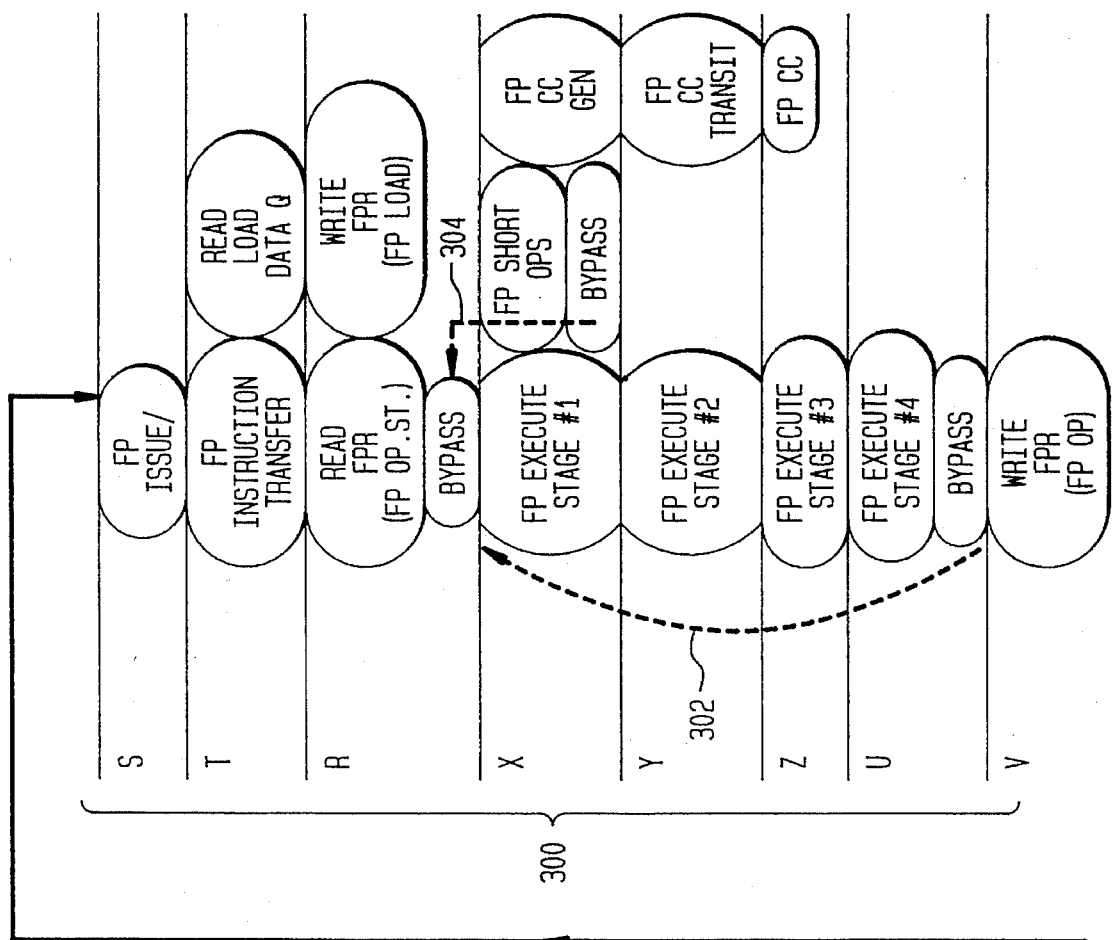
FIG. 3 shows the integer pipeline 200 of FIG. 2 and a floating point pipeline 300 according to the present invention.
Figure 3:
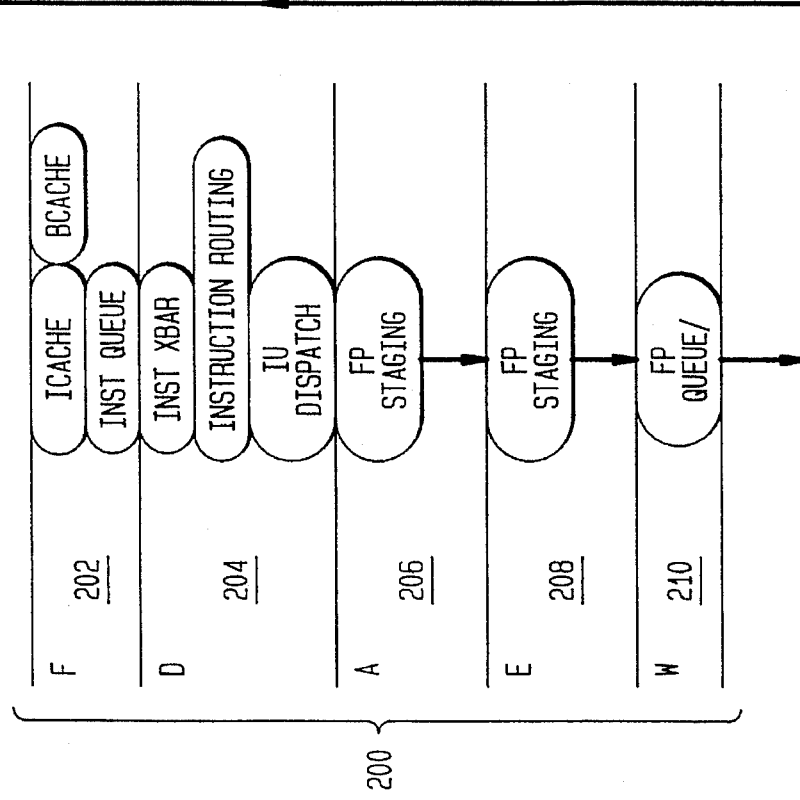

A discussion of how the system 100 dispatches floating point and integer instructions, will now be described with reference to FIG. 3. FIG. 3 shows integer pipeline 200, and a floating point pipeline 300 comprising stages S-V.

In the F stage four instructions per cycle are read out of the ICACHE 110 and placed into the IBUF 114. The D stage determines which of those instructions can actually be dispatched into the next stage in the next cycle. For instance, the system cannot do four loads in one cycle, so if four loads are present, only two could be dispatched.

As noted above, in the A stage the addresses of any memory operations, loads and stores are generated. Then, the ALU operations are preformed during the E stage and integer store state changes are made in the DCACHE 128.

Instructions are committed at stage W, and the determination of which instructions to commit is made in stage E. Floating point (FP) instructions are committed by writing them into the FPQ 118 for later execution. Integer loads and ALU operations are committed by writing their results into the IREG file 120. Integer stores write their data into the DCACHE 128 in the E stage, but are committed in the W stage by both writing the store data into the FPQ 118, and by marking the DCACHE locations already written as valid. Integer stores which are not committed (perhaps because an earlier instruction has taken an exception) have the DCACHE entries already written marked as invalid. A further description of how state changes are reflected in the splitlevel cache is found in the above cross-referenced patent application Ser. No. 08/168,832, titled "Split-Level Cache."

The FPQ 118 is guaranteed to only have instructions in it that are committed. The processor knows that when an instruction is read from the bottom of the FPQ 118, it can be executed by a FP functional unit 136, and its results can be written back to the FREG file 134 or stored into the GCACHE 108, or the like, depending on whatever the instruction calls for.

During normal operation of the pipelines 200 and 300, integer instructions can execute out of order with respect to FP instructions. However, the results of integer instructions can actually change the state of the processor in the W stage.

For instance, in an instruction stream which has integer and FP instructions in it, the integer instructions will change the state of the processor in the W stage. The FP instructions will go into the FPQ at that point. Later on, they'll be pulled out of the FPQ in an S stage and sent to the FPU to "drain" through the rest of the floating point pipeline 300: the T stage, R stage, X, Y, Z, U stage and finally, V stage. The word "drain" means that committed instructions are issued in turn to the FPU and will pass completely through the FP pipeline. At that time in the V stage, they will finally commit their state to changing the state of the processor. The actual changing of the state of the processor happens much later for FP instructions than it does for integer instructions.

At stage T, the FP instructions are transferred from the IU chip 102 to the FPU chip 104. During this stage, data for the FP instruction(s) being transferred is read from the LDQ 130 into the FREG file 134. During the next stage R, the operands for the FP instructions are read from the FREG file 134 and transferred into the FP units 136. FP load data is written into the FREG file during this stage as well.

Execution of the FP instructions begins at stage X and completes at the end of stage U. There are four execution stages X-U (stage 1–stage 4, respectively) in total. Not all instructions require 4 stages to complete execution. Short FP instructions are executed and floating point condition code (FP CC) bits are also generated during the X stage. If, for example, floating point compare operations are performed, condition codes are generated which represent the results of the comparisons. Two copies of the comparison code's bits (CC) are used. One copy of the CC bits remains in FPU 104 and another is transferred to the IU chip 102 during the next stage Y.

The bypass bubbles shown in stages R, X and U represent the ability of the FP units 136 to send results at the end of stages X and U back to the inputs of the same or other FP floating point units at the end of stage R. The bypassing is represented by dashed lines 302 and 304. In this manner, execution results are immediately available for subsequent instructions without having to wait the additional time to read new results out of the FREG file.

The Debug Mode of Operation

It is not known whether an FP instruction will cause exception until the U stage. Therefore, a timing and control problem arises if the FU takes an exception in the U stage. If the user were to make that exception precise, he would somehow have to undo all the integer operations that have happened since that FP instruction was committed back in the W stage. Many integer instructions could have committed since then. The processor system 100 has no mechanism for undoing all those instructions.

According to the present invention, precise floating point exceptions are supported by changing the way instructions flow down the pipeline. Further instructions are prevented from being committed until it can be determined that the committed FP instruction generates no exceptions.

The invention can be further described by way of example. Consider an FP instruction in the middle of what was otherwise an integer instruction stream and the processor has been switched via control logic (not shown) to run in a "debug mode" according to the invention.

The FP instruction is first fetched, decoded in stages 202 and 204, and then dispatched into the A stage on the next cycle. At this point of the debug mode, the processor stops dispatching any further instructions until that FP instruction has passed through the FPQ and has passed through most of the floating point pipeline 300.

As noted above, all integer exceptions are resolved in the E stage. An integer instruction can thus get as far as the E stage before it is determined whether that instruction has caused an exception. The state of the processor can be completely precise at that point even though many other instructions, four per stage, may be pending in the preceding A, D and F stages. Moreover, three additional instructions can be in the E stage if, for instance, the instruction that is taking the exception in the E stage is the first instruction in that stage. Thus, by the time the exception information for the FP instruction is transferred to the integer unit, the integer instruction immediately after the FP instruction only gets as far as the E stage.

During the U stage the processor determines if the FP instruction has an exception. In the V stage, that exception information is transferred to the integer unit. At that point in time, the integer unit can decide what to do with the integer instructions that are at the E stage.

As a result, once the FP instruction reaches the U stage additional instructions can be dispatched without jeopardizing the state of the processor. Even if the FP instruction generates an exception, the newly dispatched instructions can get only as far as the E stage before the FP exception is recognized. If the FP instruction takes no exceptions, the processor can start committing new instructions at full superscalar bandwidth. If the FP instruction generates an exception, that exception is signaled back to the E stage. Every single instruction after that FP instruction will be stopped from committing any state and that FP instruction's exception becomes a precise exception. The idea being that at a precise exception the state of the processor can be recovered back to the point directly before the excepting instruction was actually executed.

In accordance with the above, the present invention permits switching into and out of a debug mode for running code (i.e., a program) on the processor system 100 with precise floating point exceptions. This option facilitates running of older programs on the processor or for debugging new code.

Figure 4:
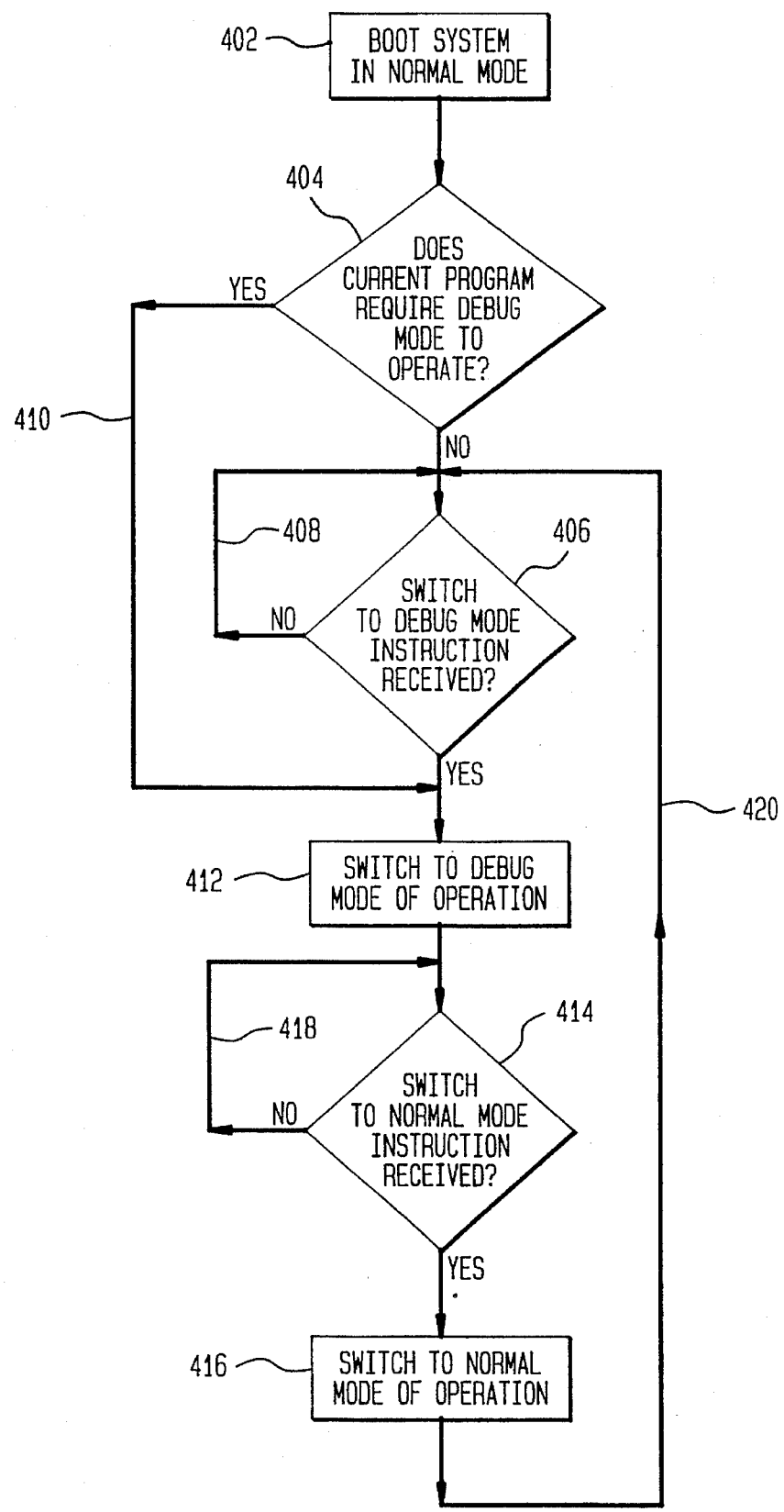
FIG. 4 shows a representative flow chart of the switching operation according to the present invention.

FIG. 4 shows a representative flow chart of the switching operation of the present invention. The processor system 100 is booted (i.e., turned on) and begins operation in normal mode without precise exceptions, as shown by a step 402. The processor determines whether the current program (set to run automatically or by a user) requires debug mode to operate with precise exceptions, as shown by a step 404. If the result in step 404 is "NO," the processor determines whether a "switch to debug mode" instruction has been received, as shown by a step 406. If the result in step 406 is "NO," the processor continues to operate in normal mode, as illustrated by a loop 408. If the result in step 404 is "YES," the processor jumps (as illustrated by a branch 410) to a step 412 and switches to the debug mode of operation with precise exceptions.

At a step 414 the processor determines whether a "switch to normal mode" instruction has been received. If the result in step 414 is "YES," the processor switches to the normal mode of operation without precise exceptions, as shown at a step 416. If the result in step 414 is "NO," the processor continues to operate in debug mode, as illustrated by a loop 418. The processor then jumps back to step 406 to monitor whether another "switch to debug mode" instruction has been received, as illustrated by a branch 420.

In the preferred embodiment the control logic (not shown) for switching into and out of debug mode is hardwired, rather that handled by microcode. The design of the necessary logic for pausing the pipeline for debug mode would be apparent to a person skilled in the relevant art in view of the above operational description of the invention. As would also be apparent to a person skilled in the relevant art, the control of the processor system 100 can be handled by a single controller or a plurality of controllers, such as state machines, distributed throughout the system on the IU and FPU chips, as well as on the GTAG and GCACHE RAMs.

While various embodiments of the present invention have been described above, it should be understood that they have been presented by way of example, and not limitation. It will be apparent to persons skilled in the relevant art that various changes in form and detail may be made therein without departing from the spirit and scope of the invention. The present invention should not be limited by any of the above-described exemplary embodiments, but should be defined only in accordance with the following claims and their equivalents. All cited patent documents and publications in the above description are incorporated herein by reference.

What is claimed is:

1. A processor system that is switchable between a normal mode of operation without precise floating point exceptions and a debug mode of operation, the processor system comprising:

means for dispatching integer and floating point instructions;

an integer unit, coupled to said means for dispatching, having a multi-stage integer pipeline for executing said integer instructions;

a floating point unit, coupled to said means for dispatching and said integer unit, having a multi-stage floating point pipeline for executing said floating point instructions; and means, coupled to said means for dispatching, for switching the system between the normal mode of operating and the debug mode of operation thereby preventing instructions from being committed after a floating point instruction is dispatched when the system is in the debug mode until the system determines whether said floating point instruction generates an exception, thus permitting the system to signal precise exceptions when not in the normal mode.

2. The system according to claim 1, wherein said means for dispatching starts to dispatch further instructions one or more floating point pipeline stages before the system determines whether said floating point instruction generates an exception.

3. A method for operating a processor system in a debug mode, wherein the system is switchable between a normal mode of operation without precise floating point exceptions and the debug mode, the method comprising the step of:

determining whether the system has been switched to the debug mode;

dispatching a floating point instruction; and switching the system between the normal mode of operating and the debug mode of operation thereby preventing instructions from being committed after a floating point instruction is dispatched when the system is in the debug mode until the system determines whether said floating point instruction generates an exception, thus permitting the system to signal precise exceptions when not in the normal mode.

4. The method according to claim 3, further comprising the step of dispatching further instructions one or more cycles before the system determines whether said floating point instruction generated an exception.

* * * * *